Dec. 3, 1968 R. T. LEWICKI 3,413,991

TWO-STAGE FLUID PRESSURE GOVERNOR

Filed Dec. 2, 1965

INVENTOR
REGINALD T LEWICKI

BY *John R. Faulkner*
*Robert E. McCollum*

ATTORNEYS

United States Patent Office 3,413,991
Patented Dec. 3, 1968

3,413,991
TWO-STAGE FLUID PRESSURE GOVERNOR
Reginald T. Lewicki, Dearborn Heights, Mich., assignor to Ford Motor Company, Dearborn, Mich., a corporation of Delaware
Filed Dec. 2, 1965, Ser. No. 511,174
10 Claims. (Cl. 137—54)

ABSTRACT OF THE DISCLOSURE

A rotatable shaft contains lateral hollow, open end extensions fluid connected to a shaft bore source of fluid under pressure varying with speed. The extensions each contain a ball valve regulating fluid pressure change, each ball valve being abutted by a bellcrank lever having the opposite end engaged by a radially outwardly moving, centrifugally responsive ball weight.

A spring preloads one ball valve to a closed position to effect a two stage governor action.

---

This invention relates in general to fluid pressure governors, and more particularly, to governors of the flyweight type.

One of the primary objects of the invention is to provide a fluid pressure governor that is inexpensive to manufacture, provides two stages of operation, and permits change of the governor pressure curve without altering the governor design.

Another object of the invention is to provide a fluid pressure governor of the fluid vent or dump type consisting of a pair of speed sensitive valve members that control the exhaust of fluid in a manner to provide an output fluid pressure signal that varies as a function of the speed of rotation of the governor.

A further object of the invention is to provide a two-stage mechanically controlled fluid pressure governor of the dump type consisting of ball-like valve members controlling the exhaust of fluid for each of the stages, the valve members being urged radially inwardly by flyball weight members acting against pivotally swingable levers mounted on the outside of the governor mechanism in such a manner that changes in the pressure build-up characteristics of the governor can be made without changing the governor design.

A still further object of the invention is to provide a fluid pressure governor having a plurality of stages in which one stage is inoperative until the other stage has completed its operation.

Other objects, features and advantages of the invention will become apparent upon reference to the succeeding, detailed description thereof, and to the drawings illustrating the preferred embodiments thereof; wherein, FIGURE 1 is a cross-sectional view of a portion of a fluid pressure governor embodying the invention;

Figure 1:
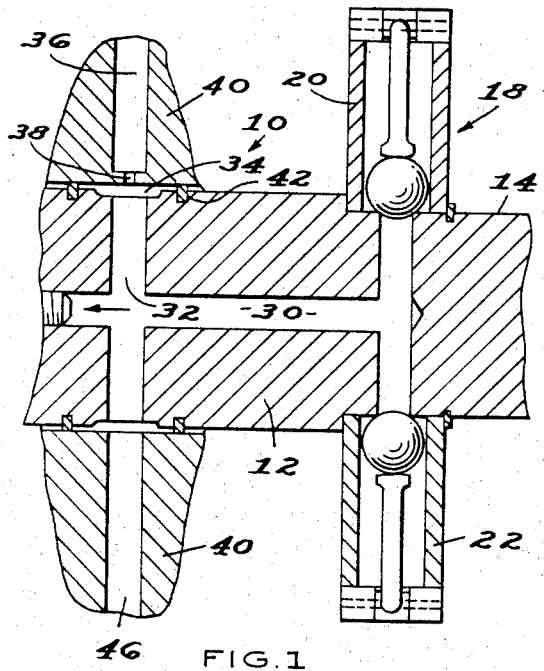

FIGURE 1 shows a portion of a fluid pressure governor 10. It includes a rotatable shaft 12 that would be connected in a suitable manner to a driving member, the speed of which is to serve as an indicator for a control. Preferably, shaft 12 would be driven by the output shaft of a motor vehicle transmission so that the fluid pressure signal force developed by the governor would be indicative of changes in vehicle speed and useful to control the shift pattern of an automatic transmission, for example. It will be clear, of course, that it could be driven by any member, whether by an engine output shaft or any other driving member, since it will provide a fluid pressure signal force indicative of the changes in speed of that member.

Shaft 12 has a reduced diameter portion 14 on which is fixedly mounted the annular hub 16 of the governor pressure controlling mechanism 18. This mechanism 18 includes two diametrically-opposed flange portions 20 and 22 extending radially outwardly from the axis of shaft 12. The flange portions are suitably bored to serve as fluid exhaust or vent conduits 24 and 26, and are radially aligned with a crossbore 28 in shaft 12.

A central fluid pressure supply passage 30 in shaft 12 connects crossbore 28 to a second crossbore 32 leading from a fluid annulus 34. The annulus receives fluid from a main fluid pressure supply line 36, as controlled by an orifice 38. Supply line 36 is bored through a portion of the stationary valve body 40, and suitable seals 42 prevent escape of fluid beyond annulus 34 along shaft 12 through the clearance between the valve body and shaft. The supply of fluid pressure to line 36 may, in this case, be provided by any suitable source such as, for example, an oil pump that is driven at a speed proportionate to engine or vehicle speed to deliver a constant supply of fluid pressure that may or may not vary in pressure, as desired.

Valve body 40 has a second circumferentially spaced passage 46 that cooperates with annulus 34 and constitutes a fluid pressure output signal line; that is, it leads to a member (not shown) to be actuated, and will reflect the changes in fluid pressure provided by the governor in the manner to be described later.

The crossbore 28 in shaft 12 is closed at its opposite ends by two ball valve means or members 48 and 50 that are slidably received within the flange bores 24 and 26, respectively. The balls are abutted by the radially extending legs 52 and 54 of bellcrank levers 56 and 57 pivotally mounted at 58 and 59 to radially outer portions of flange portions 20 and 22. The lever means have oppositely-extending leg portions 60 and 62 that are adapted to be abutted by ball-like weight members 64 and 66. The latter members are radially slidably movable in recesses 68 and 70 of extensions of the flange portions 20 and 22, respectively, the weight 66 being biased outwardly against lever 62 by a spring 72.

The mass of weights 64 and 66, and valves 48 and 50, and the force of spring 72 are suitably chosen to provide the dual-stage operation in the manner to be described. The mass of weight 64 would be greater than that of weight 66 to provide initially a faster rate of change of the pressure build-up during the first stage of operation.

In operation, with shaft 12 stationary, and no fluid under pressure supplied to line 36, the parts will be in the positions shown, and no fluid under pressure will exist in line 46. Ball valve member 48 will block off one end of crossbore 28 by gravity. If the governor should come to rest in a position other than that shown, such as for example, with the first and second stages rotated 180°, gravity acting on first stage weight 64 will press it against the lever leg 60 and maintain valve 48 closing conduit 28. Second stage ball valve member 50 is biased by spring 72 acting through weight 66 and lever 57 to maintain the opposite end of bore 28 closed below a predetermined pressure of the fluid in the bore.

Assume now that fluid under pressure is supplied to main line 36. The orifice 38 bleeds fluid into main bore 30 and crossbore 28 and output line 46 until the lines are filled with fluid. The higher pressure in line 36 will now slowly build up a pressure in bores 30 and 28 against balls 48 and 50. With shaft 12 stationary, the fluid pressure force acting against ball 48 would lift it against the weight of lever arm 52 and permit a vent or dump of the fluid out through the conduit 24, since the weight 64 is now at the bottom of the recess and no centrifugal force acts on it to urge ball 48 to a closed position. Therefore, at this time, the fluid under pressure in line 46 will be substantially zero. If an initial minimum fluid pressure in line 46 is desired, the various weights and leverages could be adjusted to provide this, or a suitable low force spring could be provided to urge weight 64 radially outwardly.

Figure 3:
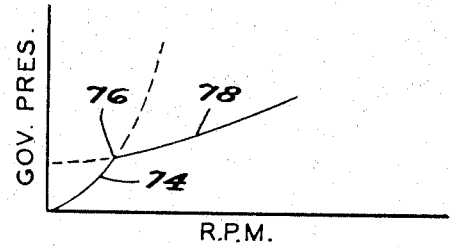
FIGURE 3 is a graph showing the rate of change of fluid pressure with speed.

Assume now that shaft 12 begins rotating. Centrifugal force, which varies as the square of the speed, acting on first-stage weight 64 urges it outwardly to pivot lever 56 and urge ball 48 to block the outlet of crossbore 28. Second-stage weight 66 at this time, due to the force of spring 72, maintains ball 50 seated or in the closed position. The pressure of the fluid in bore 28 thus builds up against ball 48 until it is sufficient to overcome the centrifugal force acting on weight 64 and move ball 48 out of the end of the bore. This permits the fluid pressure in bore 28 to decrease until it just balances the centrifugal force acting against first-stage weight 64 and the leverage provided by lever 56. At this speed level, therefore, a fluid pressure of a predetermined value will exist in output line 46 corresponding to a point on curve 74 (FIGURE 3) for this particular speed.

In most instances, the speed of shaft 12 will vary and, therefore, a progressive increase or decrease in the pressure of the fluid in line 46 will exist. Further increases in speed of shaft 12 will increase the centrifugal force acting on weight 64, moving it further radially outwardly to exert a greater force on ball 48. This causes a further increase in pressure in bore 28 until it balances the centrifugal force, at which time, further increases in fluid pressure will raise the ball out of the end of the conduit to regulate the fluid pressure at this particular level.

The above action continues until the increase in the fluid pressure in bore 28 is sufficient to unseat second stage ball valve 50. This break point is indicated at 76 in FIGURE 3. At this point, the first stage becomes inoperative, and the second stage takes over the regulation of the rate of change of pressure. That is, the centrifugal force acting on weight 64 is greater than that acting on weight 66, so that ball 48 will remain seated. Subsequent increases in shaft speed, therefore, now lift ball 50 out of the end of conduit 28 and begin regulating the governor pressure in line 46 as a function of the movement of weight 66. The change in operation due to the differences in mass between weights 64 and 66 now cause the governor pressure in line 46 to change at a rate indicated by the curve 78 shown in FIGURE 3.

Therefore, it will be seen that the invention provides a governor having two stages of operation in which the first stage provides a rapid rate of fluid pressure change up to a predetermined speed, at which point the first stage becomes inoperative and the second stage takes over to provide a slower rate of change of pressure for further increases in speed.

Decreases in vehicle speed will, of course, cause a reverse operation of the governor, the second stage providing a slower rate of change of fluid pressure level down to a predetermined speed, at which point the second stage will become inoperative and the first stage will take over to provide a more rapid decline in the rate of change of fluid pressure in line 46.

Figure 2:
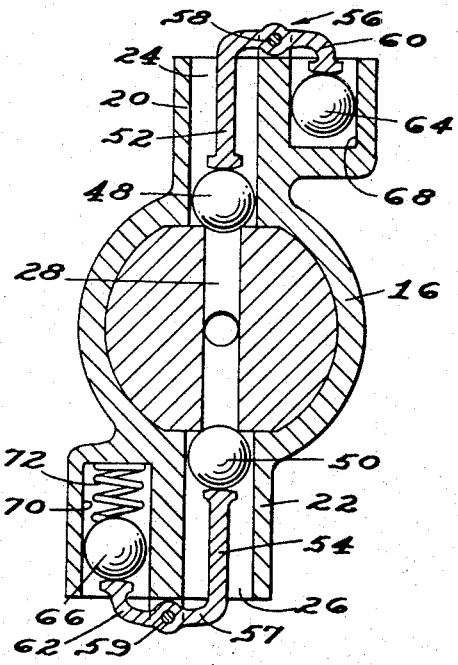
FIGURE 2 is a cross-sectional end view of the governor of FIGURE 1.
Figure 4:
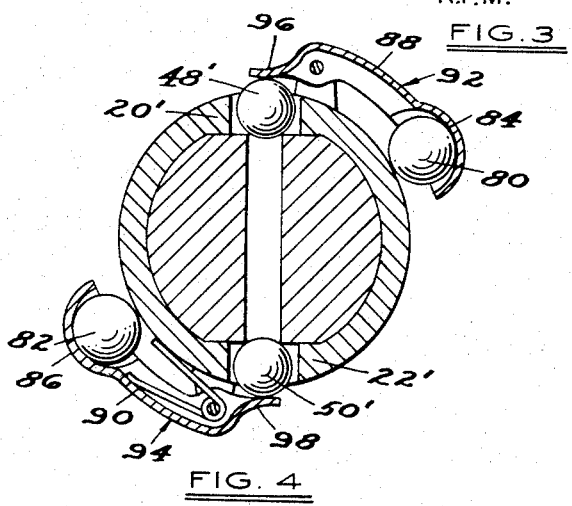
FIGURE 4 is a cross-sectional view similar to that of FIGURE 2 illustrating another embodiment of the invention.
Figure 5:
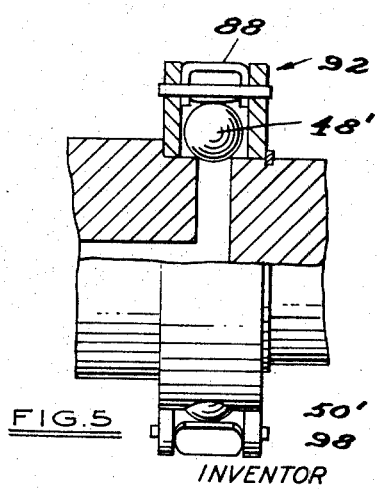
FIGURE 5 is a side-elevational view with parts broken away and in section of the FIGURE 4 showing.

FIGURES 4 and 5 illustrate a further embodiment of the invention, the over-all operation, however, remaining essentially the same. In FIGURES 4 and 5, the first and second stage weights 80 and 82 are contained in recesses 84 and 86 in legs 88 and 90 of the bellcrank-type levers 92 and 94, the oppositely-extending leg portions being crimped to form tabs 96 and 98 that bear against the ball valve members 48' and 50'. Like the construction shown in FIGURES 1 and 2, levers 92 and 94 are pivotally mounted on the outer periphery of the flange portions 20' and 22'. This particular construction has the advantage of permitting changes in the governor pressure curve shown in FIGURE 3 simply by changing the mass of weights 80 and 82, thereby eliminating the need for altering the governor design.

From the foregoing, therefore, it will be seen that the invention provides a two-stage fluid pressure governor that is simple in construction, is easy to assemble and disassemble, and is economical to manufacture since the governor body, flange portions and valves can be made of plastic, light metal or similar inexpensive material. It will also be seen that the invention provides a two-stage signal pressure that can be used to actuate any suitable mechanism where it is desired that the mechanism move as a function of the changes in speed of a particular member.

While the invention has been illustrated in its preferred embodiments, it will be clear to those skilled in the arts to which the invention pertains that many changes and modifications may be made thereto without departing from the scope of the invention.

I claim:

1. A fluid pressure governor device comprising a rotatable shaft having an element extending radially therefrom, a source of fluid under pressure, first conduit means extending through said element, second fluid conduit means interconnecting said source at all times to said first conduit means and to a fluid pressure signal line, valve means slidably movable within said first conduit means between a first non-regulating position blocking said second conduit means and other positions variably opening said second conduit means for the normally continuous regulated discharge of fluid through said first conduit means, and control means for controlling the regulating movement of said valve means, said control means including a weight operatively connected to said element for a substantially progressive radial outward movement with respect to said element in response to changes in centrifugal force acting thereon upon changes in the speed of rotation of said shaft, and means having a pivotal connection to said element and having one portion abutting said valve means and a second portion abutting said weight whereby the outward progressive movement of said weight progressively transmits a force on said valve means progressively urging said valve means towards its first position to restrict said second conduit means and permit a pressure build-up of the fluid in said second conduit means and fluid pressure signal line.

2. A governor device as in claim 1, said control means including a spring operatively biasing said valve to its first position below a predetermined speed of rotation of said shaft.

3. A governor device as in claim 1, wherein said lever and portions comprise a swingable bellcrank having leg portions extending from opposite sides of said pivotal connection.

4. A governor device as in claim 3, wherein said leg portions have parts extending in a substantially parallel relationship and radially inwardly towards the axis of said shaft.

5. A governor device as in claim 3, wherein one of said leg portions has means receiving said weight.

6. A two-stage fluid pressure governor device comprising a rotatable shaft having flange portions extending radially therefrom in opposite directions, a source of fluid under pressure, fluid vent means through each of said flange portions, fluid conduit means continually interconnecting said source to said fluid vent means and to a fluid pressure signal line, valve means slidably movable within each of said fluid vent means between a first position blocking said conduit means and other positions normally variably opening said conduit means for the discharge of fluid through said fluid vent means, and speed responsive control means for regulating the movement of said valve means, said control means including a weight member operatively connected to each of said flange portions for a substantially radial outward movement of each weight member with respect to said flange portions in response to centrifugal force acting on said weight member upon rotation of said shaft, a pair of lever means each having a pivotal connection to one of said flange portions and each having leg portions extending to opposite sides of said pivotal connection with one portion abutting said valve means and a second portion engaging one of said weight members whereby outward movement of said weight members upon changes in rotation of said shaft and flange portions exerts a force on each of said valve means urging said valve means towards its first position to block said conduit means and permit a pressure build-up of the fluid in said conduit means and fluid pressure signal line, and spring means operatively biasing one of said valve means to a closed position below a predetermined speed of rotation of said shaft.

7. A two-stage fluid pressure governor device as in claim 6, said valve means and weight members each comprising ball members, said lever means each comprising a bellcrank having parts of said leg portions extending in substantially parallel relationship to each other and radially inwardly against one of said valve means and weight members.

8. A two-stage fluid pressure governor device as in claim 7, said flange portions each having a radially extending recessed portion slidably receiving one of said weight members.

9. A two-stage fluid pressure governor device as in claim 6, one of said lever means leg portions of each of said lever means having a recess containing one of said weight members.

10. A two-stage fluid pressure governor device as in claim 6, said lever means being connected to said flange portions radially outwardly of said flange portions.

References Cited

UNITED STATES PATENTS

| 717,023 | 12/1902 | Putman. | |
|---|---|---|---|
| 3,023,625 | 3/1962 | Clement. | |
| 3,265,081 | 8/1966 | Stockton | 137—54 |
| 3,266,506 | 8/1966 | Takahashi | 137—54 |

FOREIGN PATENTS

| 913,753 | 12/1962 | Great Britain. |
|---|---|---|

CLARENCE R. GORDON, *Primary Examiner.*